(12) United States Patent
Sheu et al.

(10) Patent No.: US 7,310,393 B2
(45) Date of Patent: Dec. 18, 2007

(54) METHOD AND APPARATUS FOR SYNCHRONIZATION OF THE OFDM SYSTEMS

(75) Inventors: Chorng-Ren Sheu, Kohsiung (TW); Meng-Chun Chang, Chung-Ho (TW); Chia-Chi Huang, Hsinchu (TW); Yu-jung Chang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 687 days.

(21) Appl. No.: 10/833,586

(22) Filed: Apr. 27, 2004

(65) Prior Publication Data

US 2005/0105659 A1    May 19, 2005

(30) Foreign Application Priority Data

Oct. 31, 2003    (TW) .............................. 92130554 A

(51) Int. Cl.
*H04D 11/04* (2006.01)
(52) U.S. Cl. ........................................ 375/348; 375/354
(58) Field of Classification Search ................ 375/348, 375/354, 355, 356, 362, 363, 364, 365, 366
See application file for complete search history.

(56) References Cited

U.S. PATENT DOCUMENTS

| | | | |
|---|---|---|---|
| 5,991,289 A | 11/1999 | Huang et al. ................ 370/350 |
| 6,137,847 A | 10/2000 | Stott et al. ................... 375/344 |
| 6,181,714 B1 | 1/2001 | Isaksson et al. ............. 370/491 |
| 6,192,056 B1 | 2/2001 | Tsuruoka ..................... 370/504 |
| 6,205,188 B1 | 3/2001 | Stott et al. ................... 375/344 |
| 6,449,246 B1 | 9/2002 | Barton et al. ................ 370/210 |
| 6,597,751 B1 * | 7/2003 | Cutler ......................... 375/348 |
| 7,133,474 B2 * | 11/2006 | Ramasubramanian et al. ........................... 375/343 |
| 2002/0196731 A1 | 12/2002 | Laroia et al. ................ 370/206 |

FOREIGN PATENT DOCUMENTS

| | | |
|---|---|---|
| EP | 0 772 332 | 5/1997 |
| EP | 0 854 620 | 7/1998 |
| EP | 1 063 824 | 12/2000 |

OTHER PUBLICATIONS

T.Keller and L. Hanzo, "Orthogonal Frequency Division Multiplex Synchronization Techniques for Wireless Local Area Networks" PIMRC'96, p. 963-967,1996.
Jan-Jaa van de Beek, Magnus Sandell and Per Ola Borjesson, "ML Estimation of Time and Frequency Offset in OFDM Systems", IEEE Trans. Signal Processing, vol. 45, No. 7, Jul. 1997.

(Continued)

*Primary Examiner*—Chieh M. Fan
*Assistant Examiner*—Jaison Joseph

(57) ABSTRACT

A method and apparatus for the signal synchronization of an orthogonal frequency division multiplexing system includes a delay conjugate multiplication module, a phase processor and an edge detector. It provides estimates for the boundaries of inter-symbol interference free region by utilizing the characteristics of a guard interval in combination with the techniques of the delay conjugate multiplication module, phase differential operation, symbol-by-symbol average operation, and edge detection. The method determines a fixed optimal threshold for directly separating the inter-symbol interference region in a mobile environment to obtain an inter-symbol interference free version of symbol information.

13 Claims, 12 Drawing Sheets

OTHER PUBLICATIONS

Yung-Liang Huang; Chorng-Ren Sheu, Chia-Chi Huang; "Joint Synchronization in Eureka 147 DAB System Based on Abrupt phase Change Detection" Selected Areas in Communications, IEEE Journal on, vol. 17, Issue:10, pp. 1770-1780, Oct. 1999.

Der-Zheng Liu, Che-Ho Wei and Chung-Ju Chang, "An Extension of Guard-Interval Based Symbol and Frequency Synchronization Technique for Wireless OFDM Transmission" VTC 2001 Fall, vol. 4, p. 2324-2328,2001.

Karthik Ramasubramanian and Kevin Baum, "An OFDM Timing Recovery Scheme with Inherent Delay-Spread Estimation" Global Telecommunications Conference 2001, GLOBECOM'01, vol. 5, p. 3111-3115, 2001.

Donghoon Lee and Kyung whoon Cheun, "Coarse Symbol Synchronization Algorithms for OFDM Systems in Multipath Channels" IEEE Comm. Letters, vol. 6, No. 10, p. 446-448, Oct. 2002.

* cited by examiner

METHOD AND APPARATUS FOR SYNCHRONIZATION OF THE OFDM SYSTEMS

FIELD OF THE INVENTION

The present invention generally relates to the transmission of an orthogonal frequency division multiplexing (OFDM) system, and more specifically to a method and an apparatus for the synchronization of the OFDM systems.

BACKGROUND OF THE INVENTION

The high data rate transmission is one of the major features of the present-day wireless communication systems. Conventional single-carrier transmission technologies, such as GSM, cannot meet the needs of high data rate. This is because the signal sampling period becomes very short under the high data rate transmission, it is therefore easily affected by the channel delay spread and leads to severe inter-symbol interferences (ISI). From the frequency's point of view, the signal bandwidth of high data rate transmission is large, and in comparison to the coherent bandwidth of the channel, the signal is apparently influenced by the frequency selective fading effect of the channel. Consequently, when using the single-carrier transmission technology to transmit at high data rate, a complicated equalizer must be used to maintain a good performance. For the complexity of the receivers, it is inefficient to transmit high-rate data for using this type of communication system.

In multiple carrier transmission technologies, the high-rate data are distributed to multiple subcarriers, instead of using a single carrier. For each subcarrier, the data rate is not high, therefore the complexity of the equalizer in a receiver can be reduced. However, the multiple-carrier technologies have three major disadvantages that prevent the technologies from wide use. First of all, it takes a plurality of sinusoidal wave generators and multipliers to compute the data on the multiple subcarriers. Secondly, the subcarrier spacing must be large enough to avoid the inter-carrier interference (ICI) among the data on the multiple subcarriers. This leads to a waste of bandwidth. Finally, peak-to-average power ratio (PAPR) is large because the multiple subcarrier transmission signals are the sum of a plurality of subcarrier signals. This will lead to non-linear distortion when passing the power amplifier during the transmission.

Due to the progress of digital signal processing (DSP) and VLSI in recent years, the difficult resulted from computation complexity is improved. Also, Fast Fourier Transform (FFT) being used to implement the multiple subcarrier transmission further reduces the computational load. The use of FFT also makes the subcarriers orthogonal to each other, which leads to the better bandwidth efficiency. Therefore, this kind of multiple subcarrier transmission technology is called the FFT-based OFDM system. The FFT-based OFDM system has improved the two aforementioned disadvantages.

FIG. 1 shows a block diagram of a typical FFT-based OFDM system including an equivalent baseband transmitter and a transmission channel. Data signals d(n) are mapped respectively on N subcarriers, and an inverse FFT (IFFT) is used to implement the OFDM transmission system. The data signals on each individual subcarrier consist of m bits. The value of m depends on the modulation technology used by the signal mapper. For example, if the mapper uses quadrature phase shift keying (QPSK) modulation, the value of m is 2. The signals x(n) at the IFFT output will cyclically prefix a guard interval to form a complete OFDM symbol before the signals are transmitted into the channel. The guard interval includes $N_g$ sample points, and the useful symbol includes N sample points, as shown in FIG. 2.

In addition to the aforementioned non-linear distortion caused by the large PAPR, the use of orthogonality in the FFT-based OFDM technology also increases the sensitivity to the signal synchronization errors. This puts a higher demand on precision of the detection of the carrier frequency offset. As the carrier frequency offset increases, the orthogonality will be damaged and the system performance will rapidly deteriorate.

In addition to the detection of the carrier frequency offset, the signal synchronization includes the estimation of the symbol timing. The imprecision of the symbol timing estimation will lead to the ISI. The ISI introduced in the OFDM system is smaller than that in the single-carrier system. It is because the duration of a useful OFDM symbol (equivalent to the length of an FFT) is much longer than the duration of a symbol in the single-carrier system at the same data transmission rate. Besides, the guard interval is used to alleviate the ISI effects. Therefore, the symbol timing estimation can tolerate even further imprecision.

Symbol timing estimation in the OFDM system is usually based on the structure of the guard interval, and it uses the delay conjugate multiplication and moving average operation to roughly estimate the symbol timing. The roughly estimated symbol timing information can be used to estimate fractional carrier frequency offset. In general, the channel delay spread is much shorter than the guard interval. Therefore, the rough estimation of the symbol timing will not cause severe ISI effect, and have a relatively smaller imprecise effect on the subsequent carrier frequency offset detection. However, if the channel delay spread is close to the length of a guard interval, the ISI effects due to the imprecision of the rough symbol timing estimation is significant. Besides, it will lead to the larger imprecision of the subsequent carrier frequency offset detection.

The OFDM wireless communication systems can be divided into two categories. The first category is the broadcasting systems, including the European specification digital audio broadcasting (DAB) system and digital video broadcasting-terrestrial broadcasting (DVB-T) system. The second category is the packet switch network, including the wireless local area network (WLAN) IEEE802.1a. The broadcasting system continuously transmits the data and allows more time in signal synchronization. The channel delay spread is usually larger in this category of systems. On the other hand, the packet switch network does not transmit the continuous data, and sometimes the data may be even bursty. So it requires the signal synchronization achieved quickly after the packet transmission starts. The channel delay spread is usually smaller in this category of systems.

The U.S. Pat. Nos. 6,192,052 and 6,449,246 disclosed a symbol timing estimation obtained by the time corresponding to the largest amplitude, based on guard interval, delay conjugate multiplication module, and moving average operation. They used a moving average operation whose length is that of the guard interval. It is more suitable for white Gaussian noise channel, but it is not suitable for a multi-path channel with large delay spread. The U.S. Pat. No. 6,192,052 used the maximum correlation (MC) criterion to improve the symbol timing estimation, and the U.S. Pat. No. 6,449,246 used the maximum likelihood (ML) criterion.

The U.S. Pat. Nos. 6,181,714 and 6,205,188 disclosed a symbol timing estimation obtained by the time corresponding to the largest amplitude, based on guard interval, delay conjugate multiplication module, and symbol-by-symbol average operation. This method is suitable for a multi-path channel with larger delay spread to estimate the location of one point in the ISI-free region, but it is not suitable to estimate the location of the entire ISI-free region.

Another Patent application 2003/0026360, proposed by Motorola, disclosed a method for detecting the ISI-free region, based on guard interval, delay conjugate multiplication module, symbol-by-symbol average operation, and edge detection. However, it is more difficult to determine the value of a fixed optimal threshold to separate the ISI-free region, and it needs more computation complexity to implement.

SUMMARY OF THE INVENTION

The present invention overcomes the disadvantages of the aforementioned conventional OFDM systems. The first object of the present invention is to provide a synchronization method and an apparatus for an OFDM system. The present invention uses the cyclic prefix characteristics of the guard intervals as the basis, and uses the delay conjugate multiplication module, phase differential operation, symbol-by-symbol average operation and edge detection to estimate the location of the entire ISI-free region. For a multi-path channel with large delay spread, the present method performs well and it is more suitable for the broadcasting system, such as DAB and DVB-T systems.

The present invention can be divided into three major parts and two symbol-by-symbol average operations are used. The three major parts include a delay conjugate multiplication module, a phase processor, and an edge detector.

As shown in FIG. 3, the first part is performing the delay conjugate multiplication for the received signals, passing through the first symbol-by-symbol average operation, and taking the normalized phase to obtain the output signal $\theta_1(n)$. The delay conjugate multiplication module is based on the cyclic prefix characteristics of the guard interval and the first symbol-by-symbol average operation is used to reduce the noise effects.

The phase processor of the second part includes performing the phase differential operation, taking the absolute value and then passing through the second symbol-by-symbol average operation. The object of the phase processor is used to obtain a feature signal $\theta_4(n)$ that can indicate the location of the ISI-free region, and the second symbol-by-symbol average operation is used to reduce the channel fading effects.

The edge detector of the third part is used to detect the location of the ISI-free region. From observing the variations of the feature signal $\theta_4(n)$, the statistic characteristics of those sample points in the ISI region are less affected by the changes of the signal-to-noise ratio (S/N). Therefore, it is easy to determine the value of a fixed optimal threshold to directly separate the ISI region. Because the relationships between the locations of the ISI region and ISI-free region are fixed, the location of the ISI-free region can be detected directly by using the location information of the ISI region.

The preferred embodiment will be compared with the method proposed by Motorola Labs in a two-path fading channel with the power ratio 1:1, and the standard deviation of the estimated symbol timing for the both methods are observed. It is easier for the present invention to determine the value of a fixed optimal threshold to directly separate the ISI region. Even in a severe frequency selective fading channel, the present invention can sample most of the symbol data which are not affected by the ISI as long as the ISI-free region exists and the last point of the sampling window is selected at the middle point of the ISI-free region in the receiver. Then, these symbol data will pass through the FFT operation and perform demodulation on the frequency domain.

The foregoing methods and the other objects, features, aspects and advantages of the present invention will become easier to understand from a careful reading of a detailed description provided herein below with appropriate reference to the accompanying drawings.

DETAILED DESCRIPTION OF THE PREFERRED EMBODIMENTS

Figure 1:
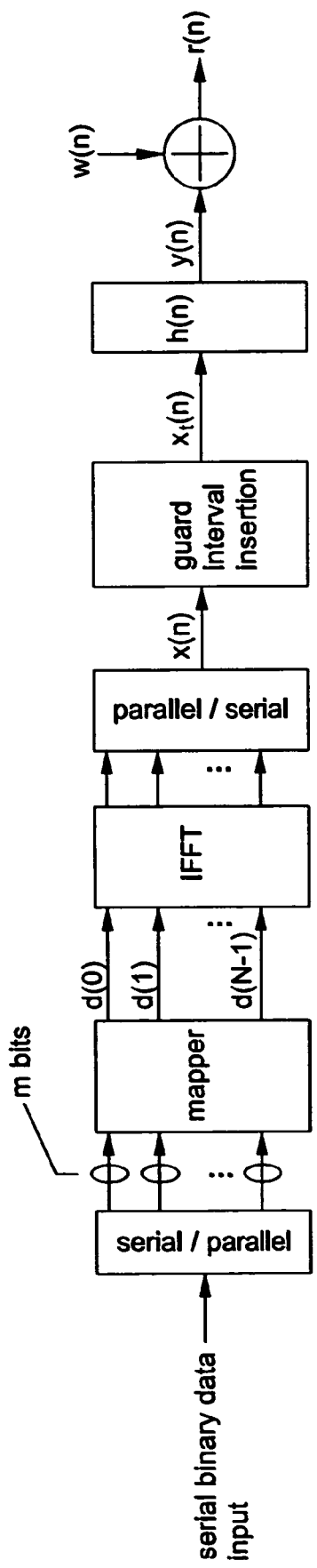
FIG. 1 shows a block diagram of a typical FFT-based OFDM system including an equivalent baseband transmitter and a transmission channel.
Figure 2:
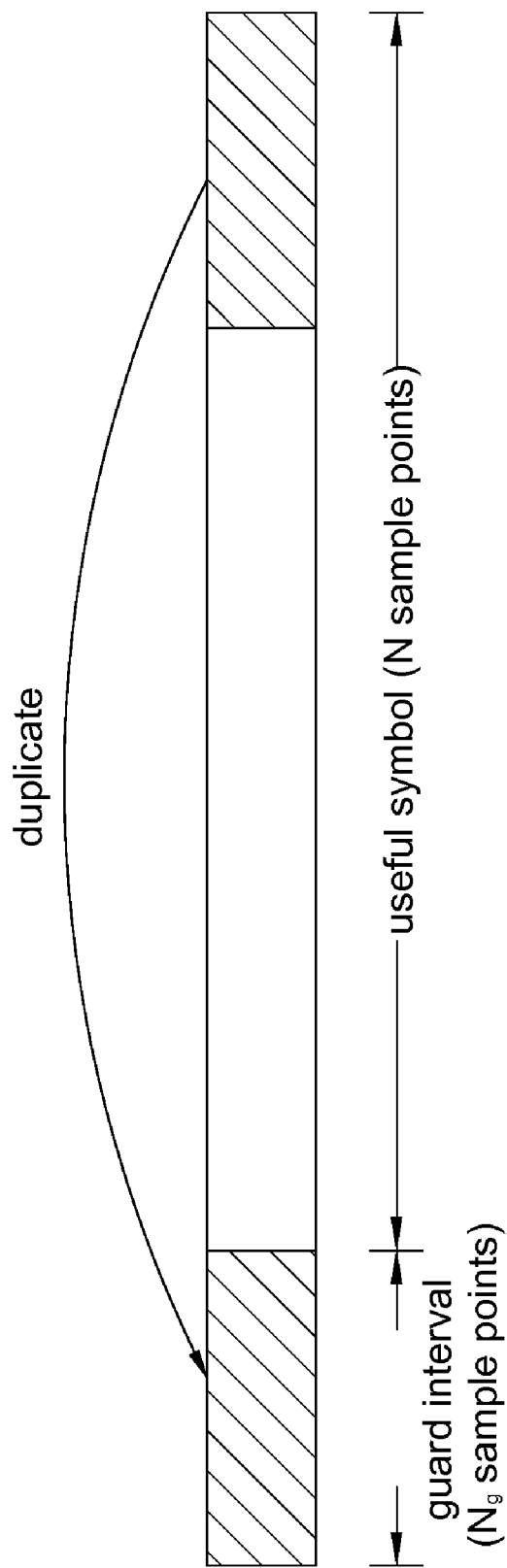
FIG. 2 shows a schematic view of a complete OFDM symbol.
Figure 3:
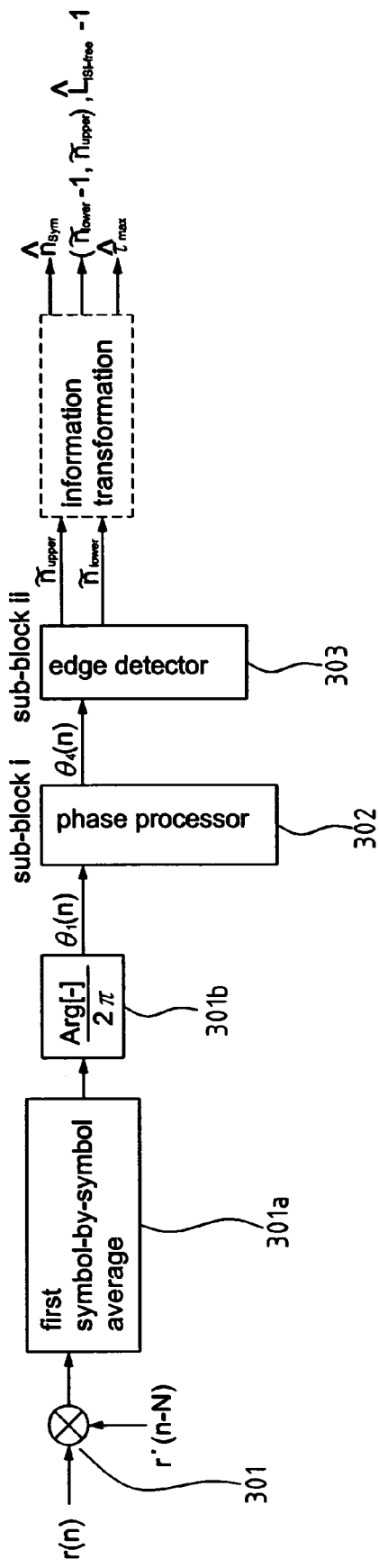
FIG. 3 shows a block diagram of the synchronization method according to the present invention.

FIG. 3 is a block diagram of the synchronization method and apparatus for the OFDM system. As shown in FIG. 3, the method can be divided into three major parts: delay conjugate multiplication module 301, phase processor 302 and edge detector 303.

The first part is to perform the delay conjugate multiplication for the received signal r(n), pass through the first symbol-by-symbol average operation 301a, and use a phase calculator 301b to obtain the normalized phase signal $\theta_1(n)$. The delay conjugate multiplication module that calculates the product of the received signal and its N-sample-delayed and conjugate version is based on the cyclic prefix characteristic of the guard interval. The symbol-by-symbol average operation 301a is used to reduce the noise effects. The symbol-by-symbol average operation 301a, the cyclic prefix characteristics of the guard interval, and the definition of ISI-free region will be described as below.

Based on the present invention, the symbol-by-symbol average operates as the following equation (1).

$$y(l, n) = \frac{1}{L}\sum_{i=0}^{L-1} x(l \cdot L + i, n), \quad (1)$$

$$l = 0, 1, 2, \ldots \text{ and } n = 0, 1, 2, \ldots, N_{total}$$

Where the duration of a complete OFDM symbol $N_{total}T$ equals the sum of an effective OFDM symbol duration $NT$ and the guard interval duration $N_gT$ where T is the sample period. x(m,n) indicates the input value of the n-th sample point in the m-th OFDM symbol, and y(l,n) indicates the output value of the n-th sample point in the l-th OFDM symbol. The value L indicates the window size of the symbol-by-symbol average operation. One output OFDM symbol can be obtained when L OFDM symbols input the symbol-by-symbol average operation.

Figure 4:
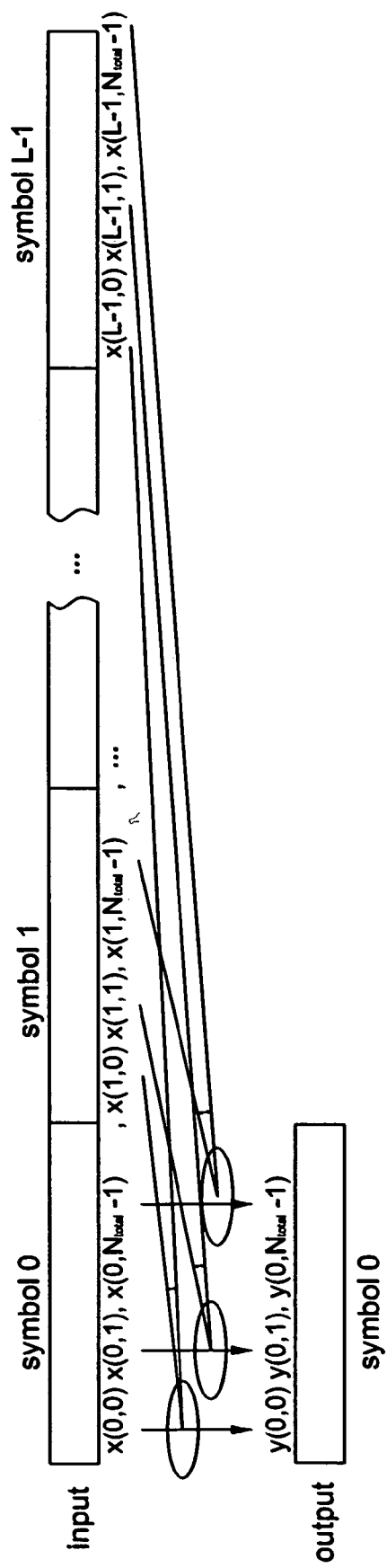
FIG. 4 illustrates the symbol-by-symbol average operation.

FIG. 4 uses the first OFDM symbol of the symbol-by-symbol average output signal as an example, i.e. l equals 0, to explain the average operation. When L OFDM symbols x(m,n) where m indicates from 0 to L-1 and n indicates from 0 to $N_{total}$-1 input the symbol-by-symbol average operation, one output OFDM symbol y(l,n) where l equals 0 and n indicates from 0 to $N_{total}$-1 can be obtained. The symbol-by-symbol average operation is used to reduce the noise effects.

In the present invention, two symbol-by-symbol average operations are used. The first symbol-by-symbol average operation 301a has the length of L1 OFDM symbols, and it is used to reduce the noise effects. The second symbol-by-symbol average operation is in phase processor 302, which will be described in detail afterward.

The following describes the cyclic prefix characteristics of the guard interval in an ideal channel, a white Gaussian noise channel, and a multi-path fading channel. The ISI region, partial ISI region, and ISI-free region are also defined.

Figure 5:
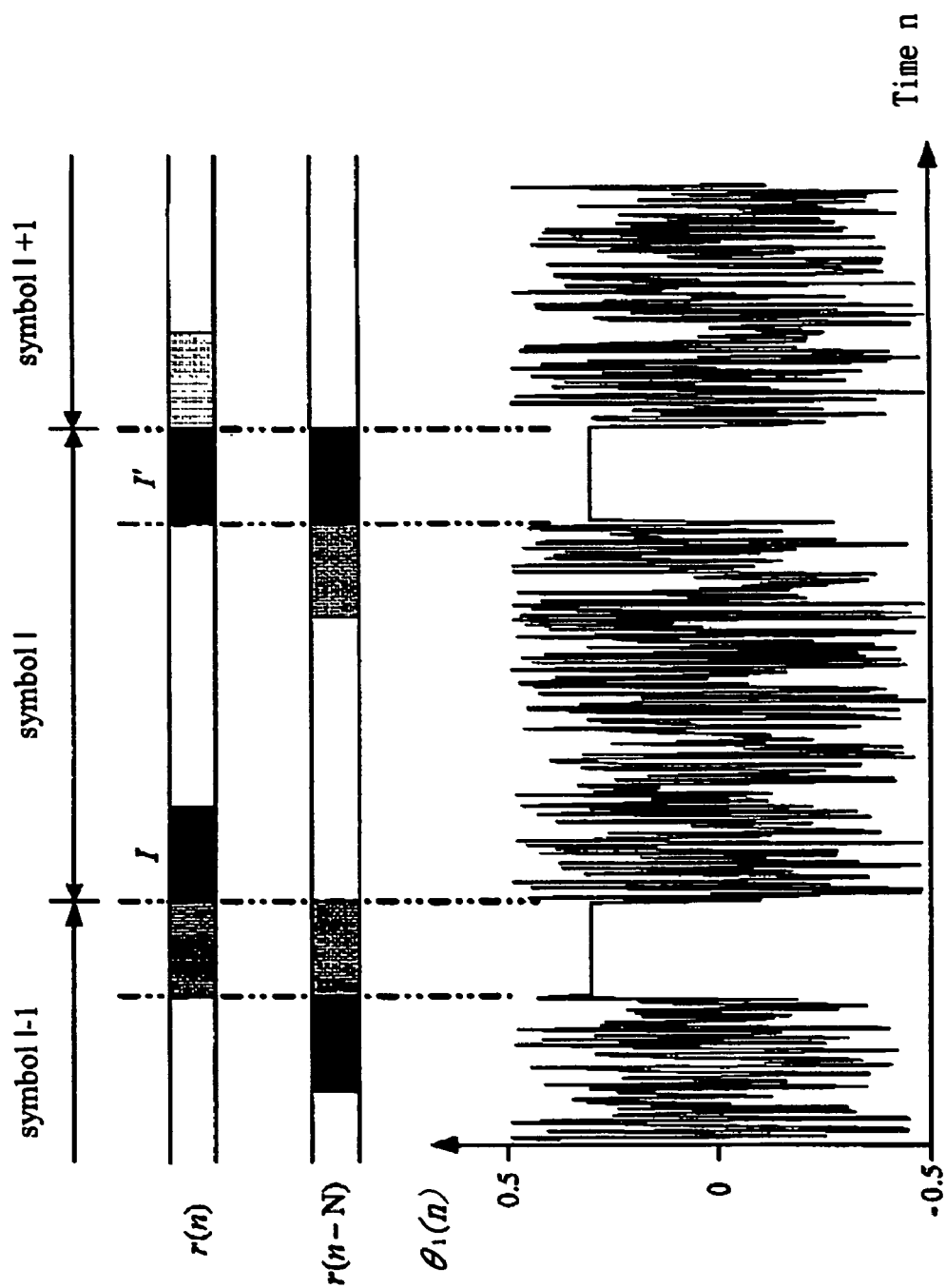
FIG. 5 shows a schematic view of the cyclic prefix characteristics of the guard interval in an ideal channel.

FIG. 5 is a schematic view of the cyclic prefix characteristics of the guard interval in the ideal channel. The ideal channel is affected by neither multi-path fading nor white Gaussian noise. In an ideal channel, the received signal r(n) equals to the original transmitted signal. The received signal with carrier frequency offset can be shown mathematically in equation (2). In the ideal channel, the normalized phase of the delay conjugate multiplication module output is shown in FIG. 5.

$$r(n) = x_t(n) \cdot e^{j2\pi\Delta f_0 nT} = x_t(n) \cdot e^{j2\pi\frac{\varepsilon}{NT}nT} = x_t(n) \cdot e^{j\frac{2\pi n\varepsilon}{N}} \quad (2)$$

where $\Delta f_0$ is the carrier frequency offset with Hz as the unit, and $\varepsilon$ is the normalized carrier frequency offset with sub-carrier spacing $$\left(\frac{1}{NT}\right)$$

as the unit.

In FIG. 5, an interval whose size is the length of the guard interval is located at the end of every complete OFDM symbol. Within this interval, the value of the normalized phase signal $\theta_1(n)$ is constant. This interval is defined as region I'. The reason for this phenomenon is that the received signal and its N-sample-delayed version are the same within the region I'; therefore, the only remaining effect for the delay conjugate multiplication signal $M_r(n)$ within the region I' is the constant phase offset caused by the carrier frequency offset, as shown in equations (3), (4) and (5).

$$M_r(n) = r(n) \cdot r^*(n-N) = x_t(n) \cdot e^{\frac{j2\pi n\varepsilon}{N}} \cdot x_t^*(n-N) \cdot e^{\frac{-j2\pi(n-N)\varepsilon}{N}} \quad (3)$$

$$M_r(n) = |x_t(n)|^2 \cdot e^{j2\pi\varepsilon} \text{ for } n \in I' \quad (4)$$

$$\theta_1(n) = \arg\{M_r(n)\}/2\pi \quad (5)$$

If the location of the region I' is known, equations (4) and (5) show that the normalized carrier frequency offset can be obtained from the normalized phase signal $\theta_1(n)$.

Figure 7A:
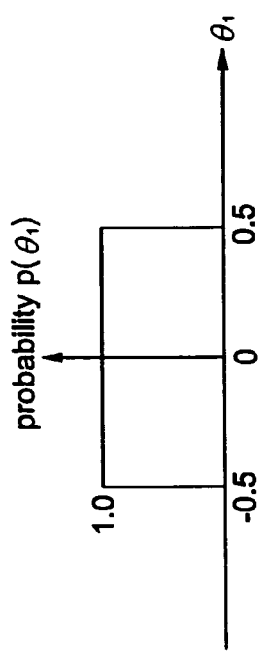
FIG. 7a shows a schematic view of the probability distribution of phase $\theta_1(n)$ in the ISI region for a multi-path fading channel.

Because the normalized phase signal $\theta_1(n)$ ranges between $-\pi$ and $\pi$, the estimated normalized carrier frequency offset must also be within the range $-0.5$ and $0.5$. Therefore, we define the normalized carrier frequency offset based on the equations (4) and (5) is the fractional carrier frequency offset. In general, the carrier frequency offset in the broadcasting systems is large, so the detection of the integral carrier frequency offset is also necessary. The probability distribution of the normalized phase signal $\theta_1(n)$ outside the region I' is the uniform distribution, as shown in FIG. 7a.

In a white Gaussian noise channel, the normalized phase signal $\theta_1(n)$ within the region I' will be affected by the noise. Theoretically, the expected value of the normalized phase signal $\theta_1(n)$ within the region I' would be the normalized fractional carrier frequency offset. The probability distribution of the normalized phase signal $\theta_1(n)$ outside the region I' is also the uniform distribution as shown in FIG. 7a.

In a non-multi-path fading channel, such as an ideal channel, a white Gaussian noise channel, and a single-path fading channel, the present invention defines the region I' in each complete OFDM symbol as the ISI-free region. We also define the region that is outside the region I' as the ISI region. In the non-multi-path fading channels, the sample points of the ISI-free symbol can be obtained as long as the last point of the FFT sampling window is selected within the ISI-free region.

In the multi-path fading channel, the present invention needs two pre-requisite conditions to detect the ISI-free region. The first condition is that the fading profile of each arrival path is nearly constant during N sample periods. This condition assures the cyclic prefix characteristics of the guard interval in the fading channel. This condition must also be satisfied in the single path fading channels. The second condition is that the maximum delay spread must be shorter than the guard interval. This condition must be satisfied to assure the existence of the ISI-free region.

Figure 6:
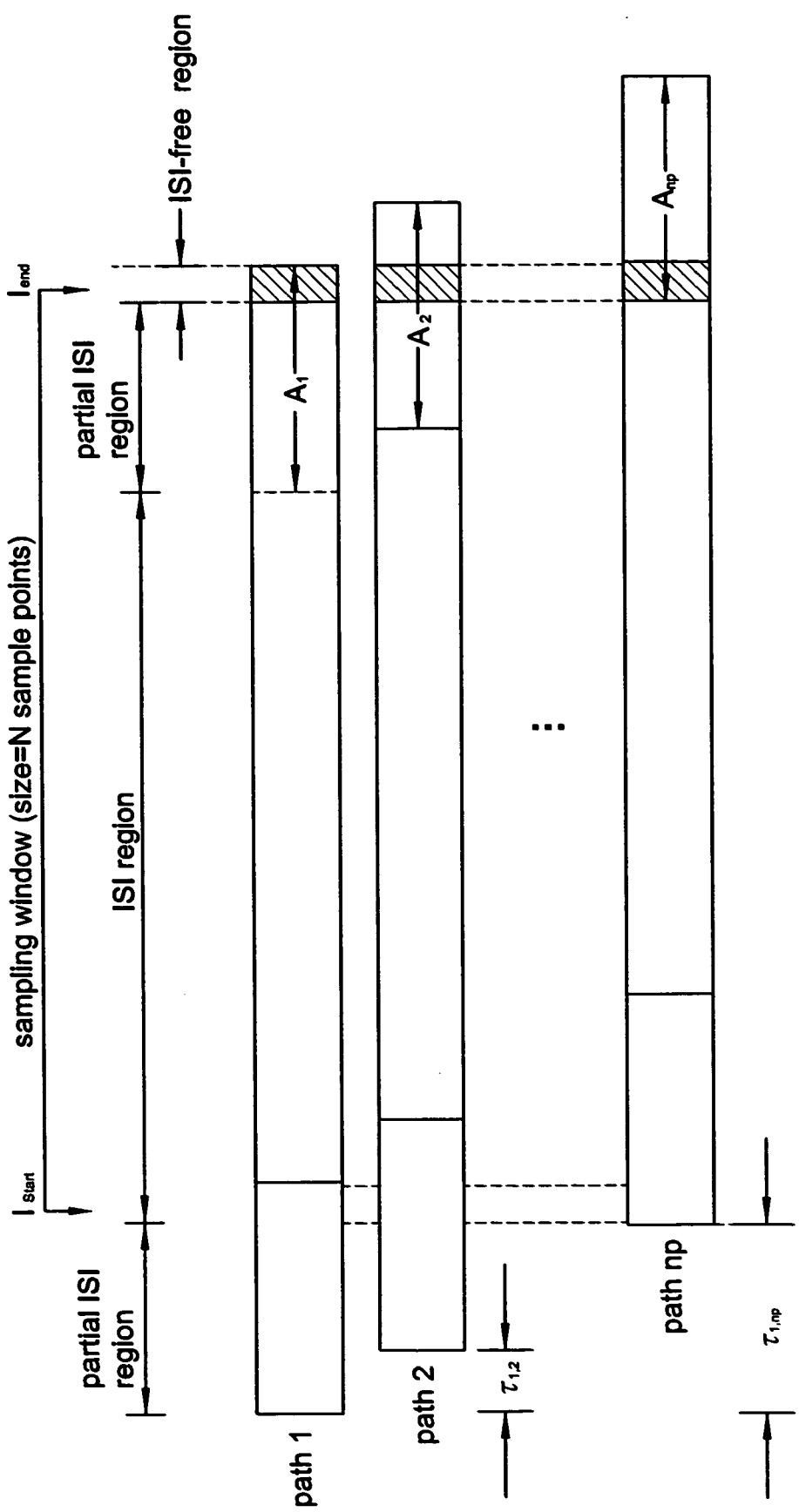
FIG. 6 shows a schematic view of the ISI region, partial ISI region, and ISI-free regions defined in a multi-path fading channel.

FIG. 6 is a schematic view of the ISI region, partial ISI region, and ISI-free region in a multi-path fading channel where the number of all the arrival paths is np. When the aforementioned first condition is satisfied, due to the cyclic prefix characteristics, a region that is similar to the region I' will exist at the end of each complete OFDM symbol for all the arrival paths. The region is defined as Ai region where i is from 1 to np. If the last point of the FFT sampling window is selected within the Ai region, there will be no ISI caused by the i-th arrival path. As long as the maximum delay spread ($\tau_{1,np}$) of the np-path fading channel is shorter than the length of the guard interval, a completely overlapped region between all the Ai regions where i ranges from 1 to np will occur, as shown in FIG. 6. The completely overlapped region is defined as the ISI-free region. This is the reason for the second condition. If the last point of the FFT sampling window is selected within this ISI-free region, there will be no ISI caused by all the arrival paths.

In the multi-path fading channels, each complete OFDM symbol can be divided into three regions: the ISI region, the partial ISI region, and the ISI-free region, as shown in FIG. 6. Define the time axis of the first arrival path as the standard time axis. There are two regions whose size is $\tau_{1,np}$ adjacent to the ISI-free region in each complete OFDM symbol. If the last point of the FFT sampling window is selected within these two regions, ISI would be caused by some arrival paths, while some other arrival paths would not. These two regions are defined as the partial ISI region. The other part outside the partial ISI region and ISI-free region in each complete OFDM symbol is defined as the ISI region. If the last point of the FFT sampling window is selected within this ISI region, ISI would be caused by all the arrival paths. Similarly, the fractional carrier frequency offset can be estimated by the normalized phase signal $\theta_1(n)$ within the ISI-free region in a multi-path fading channel.

The following describes the phase processor.

Figure 8:
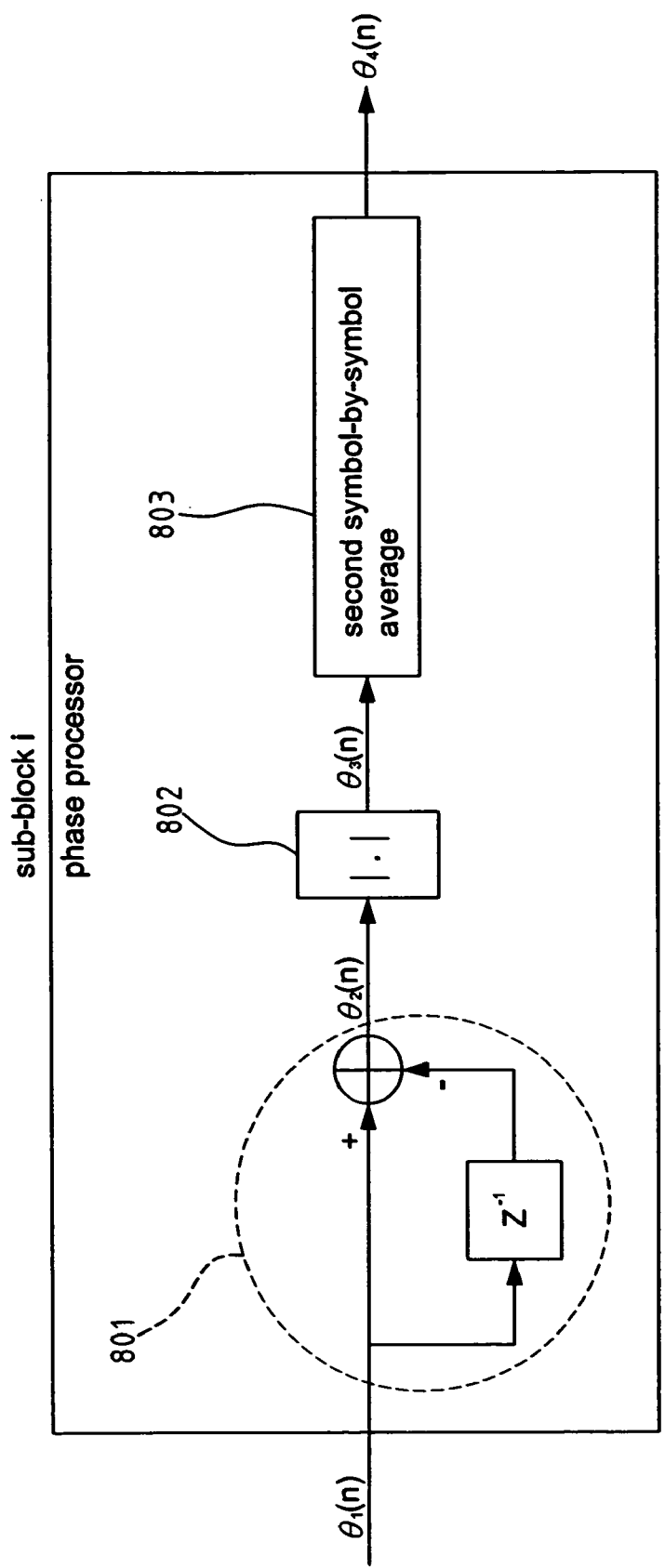
FIG. 8 shows a schematic view of the phase processor for sub-block i.

FIG. 8 shows a schematic view of the phase processor for sub-block i. The phase processor includes a differential operation 801, an absolute value calculator 802 and a second symbol-by-symbol average operation 803. The purpose of the phase processor is to form the feature signal $\theta_4(n)$ and the location of the ISI-free region can be detected from the feature signal. The second symbol-by-symbol average operation, whose size is L2 OFDM symbols is used to reduce the channel fading effects.

The following describes the operation of the phase processor sub-block i in an ideal channel, a white Gaussian noise channel, and a multi-path fading channel.

Figure 7B:
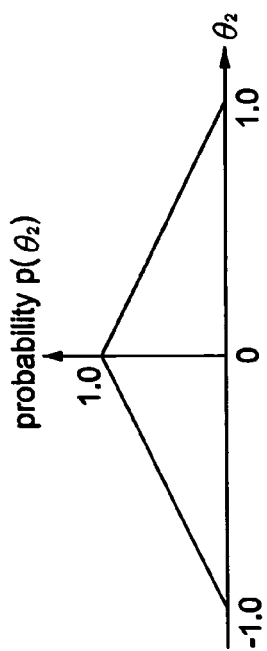
FIG. 7b shows a schematic view of the probability distribution of phase $\theta_2(n)$ in the ISI region for a multi-path fading channel.

First, the operation of the phase processor in an ideal channel will be described. The signal $\theta_1(n)$ remains the fixed value within the region I' (ISI-free region) in each complete OFDM symbol in an ideal channel, as shown in FIG. 5. The probability distribution of the signal $\theta_1(n)$ outside the region I' is an uniform distribution, as shown in FIG. 7a. The differential operation is then performed on the signal $\theta_1(n)$ to obtain $\theta_2(n)$. The sample points of signal $\theta_2(n)$ have the value of zero within the region I' in each complete OFDM symbol. The probability distribution of the signal $\theta_2(n)$ outside the region I' is the isosceles triangle distribution, as shown in FIG. 7b. The function of taking absolute value is performed on the signal $\theta_2(n)$ to obtain $\theta_3(n)$. The sample points of signal $\theta_3(n)$ still have the value of zero within the region I' in each complete OFDM symbol. The probability distribution of the signal $\theta_3(n)$ outside the region I' is the right triangle distribution, as shown in FIG. 7c.

The statistic characteristics of the signal $\theta_3(n)$ outside the region I' can be inferred from its probability distribution. After calculation, the theoretic average and standard deviation of the signal $\theta_3(n)$ outside the region I' are $$\frac{1}{3} \text{ and } \frac{1}{\sqrt{18}}.$$

Signal $\theta_3(n)$ is then passed through the second symbol-by-symbol average operation (whose length is L2 symbols) to obtain $\theta_4(n)$. The average operation is used to reduce the channel fading effects. The sample points of signal $\theta_4(n)$ still have the value of zero within the region I' in each complete OFDM symbol. According to the central limit theorem, the distribution of the feature signal $\theta_4(n)$ outside the region I' in each complete OFDM symbol is the Gaussian distribution of which the theoretic average and standard deviation are $$\frac{1}{3} \text{ and } \frac{1}{\sqrt{18(L2)}}.$$

Figure 7C:
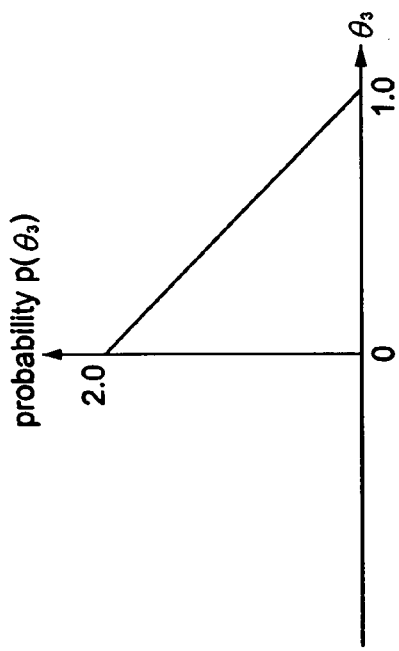
FIG. 7c shows a schematic view of the probability distribution of phase $\theta_3(n)$ in the ISI region for a multi-path fading channel.

In a white Gaussian noise channel and a multi-path fading channel, the probability distributions of the signals $\theta_1(n)$, $\theta_2(n)$, and $\theta_3(n)$ within the ISI region are the same as those described in the ideal channel, as shown in FIGS. 7a, 7b, and 7c. The values of these signals within the ISI-free region are different from those described in the ideal channel due to the white Gaussian noise effects and the multi-path fading effects. In such channels, the value of the signal $\theta_1(n)$ is no longer fixed, and the values of the signals $\theta_2(n)$ and $\theta_3(n)$ are non-zero.

Figure 9:
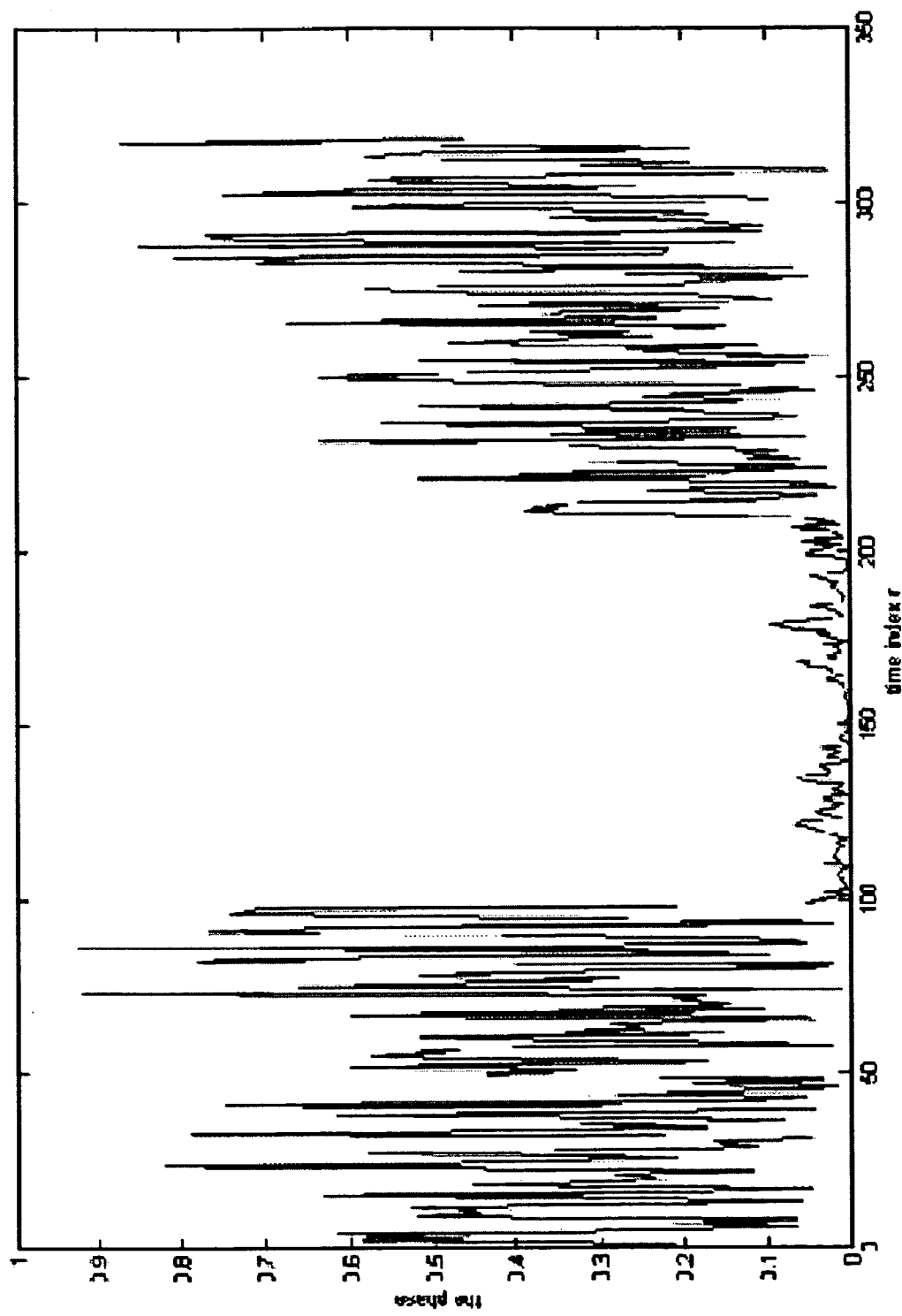
FIG. 9 shows the variations of the feature signal $\theta_4(n)$ for the preferred embodiment.

Using only the first symbol-by-symbol average operation as an example (i.e. L2=1), the S/N is 7 dB and the length of the guard interval is 31 μsec. The two-path fading channel has the following parameters: the power ratio of the two paths is 1:1, the delay spread is 25 μsec, and the speed of the vehicle is 100 kilometers per hour. Because there exists a fixed mapping relationship between the boundaries of the ISI region and the boundaries of the ISI-free region, the present invention detects first the location of the ISI region, and then uses the fixed mapping relationship to find the location of the ISI-free region. FIG. 9 shows the variations of the feature signal $\theta_4(n)$, in which the location of the ISI region can be clearly identified.

The following describes the edge detector.

The purpose of the edge detector is to detect the location of the ISI-free region from observing the variations of the feature signal $\theta_4(n)$. Based on the aforementioned analysis, the statistics characteristics of the feature signal $\theta_4(n)$ within the ISI-free region will vary and depend on the S/N. It is therefore difficult to define a fixed optimal threshold to directly separate the ISI-free region for the multi-path fading channel with different S/N. Based on the aforementioned analysis, the statistics characteristics of the feature signal $\theta_4(n)$ within the ISI region are independent of the S/N. It is therefore easier to define a fixed optimal threshold to directly separate the ISI region in any mobile environment.

Figure 10:
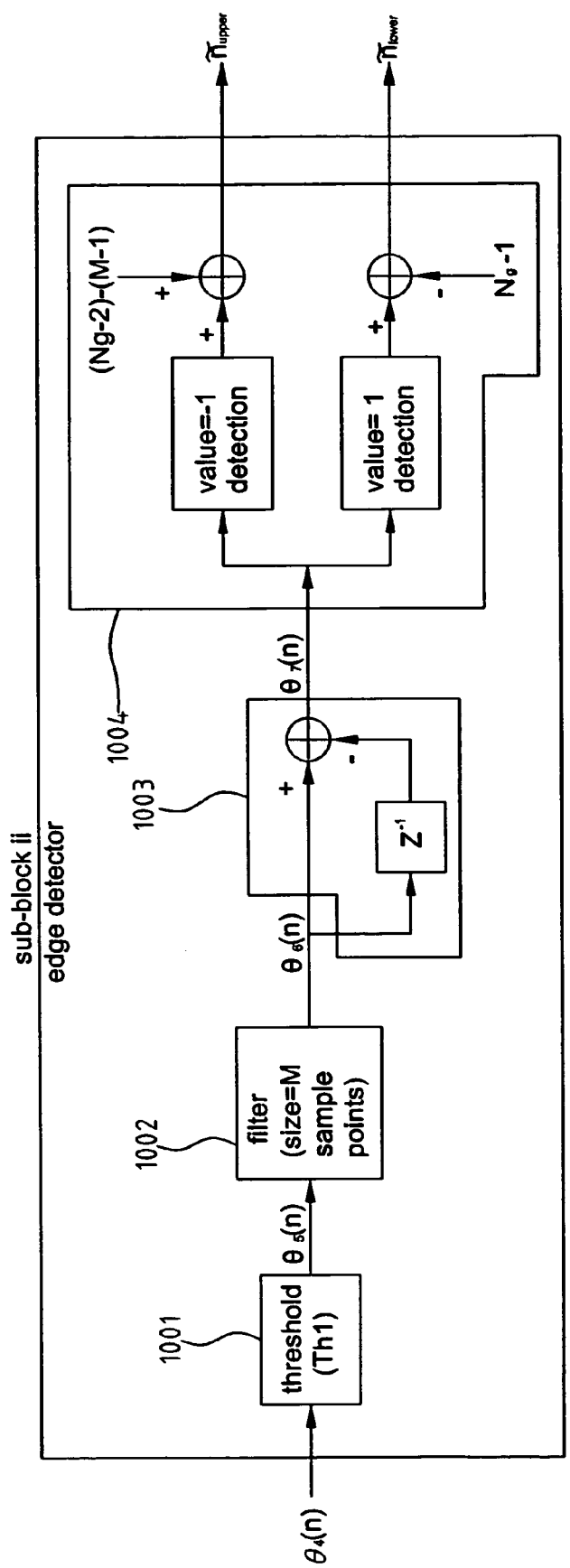
FIG. 10 shows a schematic view of the edge detector for sub-block ii.

FIG. 10 shows a schematic view of the edge detector sub-block ii.

Threshold calculator 1001, which calculates a fixed optimal threshold value Th1 to roughly separate the ISI region is performed on the feature signal $\theta_4(n)$ to obtain signal $\theta_5(n)$. The relation between the feature signal $\theta_4(n)$ and the signal $\theta_5(n)$ is shown in equation (6).

$$\theta_5(n) = \begin{cases} 1 & \text{if } \theta_4(n) \geq Th1 \\ 0 & \text{if } \theta_4(n) < Th1 \end{cases} \quad (6)$$

where the threshold value Th1 is defined in accordance with the statistic characteristics of the feature signal $\theta_4(n)$, as shown in equation (7).

$$Th1 = \text{Mean}(\theta_4) - \alpha \times STD(\theta_4) \quad (7)$$

where $\text{Mean}(\theta_4)$ and $STD(\theta_4)$ are the values of mean and standard deviation of the signal $\theta_4(n)$ From foregoing analysis, $$\text{Mean}(\theta_4) = \frac{1}{3}, \; STD(\theta_4) = \frac{1}{\sqrt{18(L2)}}$$

and $\alpha$ is a variable. L2 equals 1 is used in the preferred embodiment Therefore, the threshold value Th1 can be determined before the system operation.

The next step is to use a filter 1002 with a length of M sample periods to clearly separate the ISI region. The relation between the input and the output of the filter is shown in equation (8).

$$\theta_6(n) = \begin{cases} 0 & \text{if } \sum_{i=0}^{M-1} \theta_5(n-1) = 0 \\ 1 & \text{otherwise} \end{cases} \quad (8)$$

Then, the differential operation 1003 is used to find the relative location of the ISI region. Due to the operation of the filter, the relative estimated location is not the actual location of the ISI region, but with a fixed offset. The value of the offset is related to the length M of the filter. Finally, the simple mapping functions are performed on the relative location of the ISI region to obtain the estimated location of the ISI-free region. The first mapping function is to add a parameter to the timing location of the signal $\theta_7(n)$ whose value is −1 to obtain the estimated upper boundary $\tilde{n}_{upper}$ of the ISI-free region. The parameter is determined by the difference between Ng and M, for example, (Ng−2)−(M−1), as shown in FIG. 10. The second mapping function is to subtract a parameter from the timing location of the signal $\theta_7(n)$ whose value is 1 to obtain the estimated lower boundary $\tilde{n}_{lower}$ of the ISI-free region. The parameter is determined by the value Ng, for example, (Ng−1), as shown in FIG. 10.

Three types of useful information can be obtained by using the estimated boundaries ($\tilde{n}_{lower}$, $\tilde{n}_{upper}$). First of all, because the present invention uses the delay conjugate multiplication module and two phase differential operations, therefore, the actual lower boundary $\hat{n}_{lower}$ of the ISI-free region should be two sample periods lower than the estimated lower boundary $\tilde{n}_{lower}$, and the actual upper boundary $\hat{n}_{upper}$ of the ISI-free region should be the same as the estimated upper boundary $\tilde{n}_{upper}$. The actual boundaries of the ISI-free region should be ($\tilde{n}_{lower}$−2, $\tilde{n}_{upper}$). The middle point $\hat{n}_{Sym}$ and the length $\hat{L}_{ISI\text{-}free}$ of the two boundaries can be expressed as the equations (9) and (10).

$$\hat{n}_{Sym} = \frac{\hat{n}_{lower} + \hat{n}_{upper}}{2} = \frac{(\tilde{n}_{lower} - 2) + \tilde{n}_{upper}}{2} \quad (9)$$

$$\hat{L}_{ISI\text{-}free} = \hat{n}_{upper} - \hat{n}_{lower} + 1 = \tilde{n}_{upper} - \tilde{n}_{lower} + 3 \quad (10)$$

The middle point $\hat{n}_{Sym}$ can be used as the estimated symbol timing and this allows the more tolerance to the sampling clock offset.

Second, the information of the ISI-free region can be used to estimate the fractional carrier frequency offset (FFO). Because the present invention uses the phase differential operation, the actual lower boundary of the ISI-free region for estimating the FFO is located one sample period lower than the estimated lower boundary $\tilde{n}_{lower}$, and the actual upper boundary of the ISI-free region for estimating the FFO is the same as the estimated upper boundary $\tilde{n}_{upper}$. Therefore, the received signal between the boundaries ($\tilde{n}_{lower}$−1, $\tilde{n}_{upper}$), with the length $\hat{L}_{ISI\text{-}free}$−1 can be used to estimated the FFO.

The third useful information is to estimate the maximum delay spread with the estimated boundaries ($\tilde{n}_{lower}$, $\tilde{n}_{upper}$). The maximum delay spread $\hat{\tau}_{max}$ of the multi-path fading channel can be expressed as equation (11).

$$\hat{\tau}_{max} = (N_g + 1) - \hat{L}_{ISI\text{-}free} \quad (11)$$

Figure 11A:
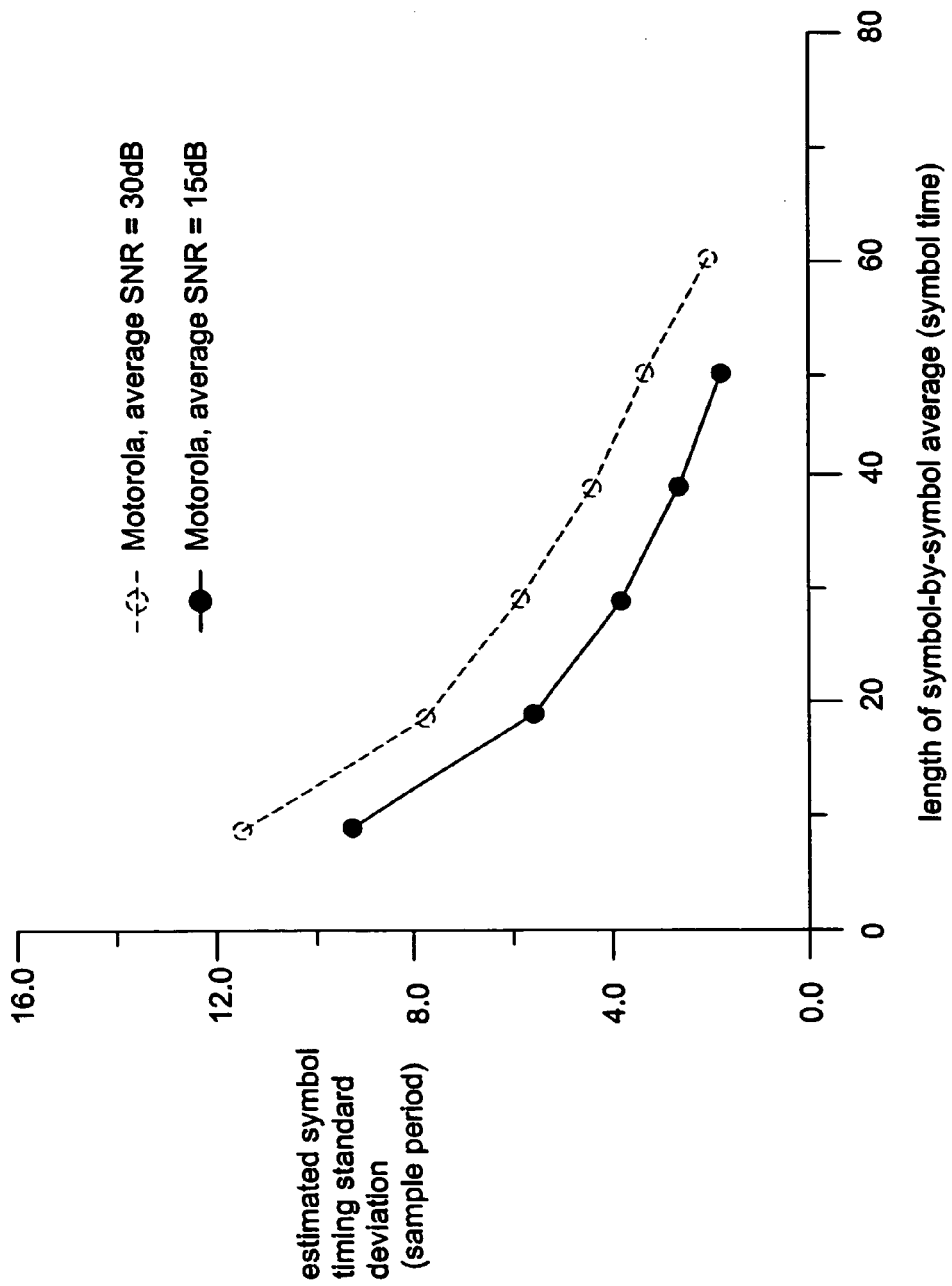
FIG. 11a shows the simulated results for the method proposed by Motorola Labs under different S/N.
Figure 11B:
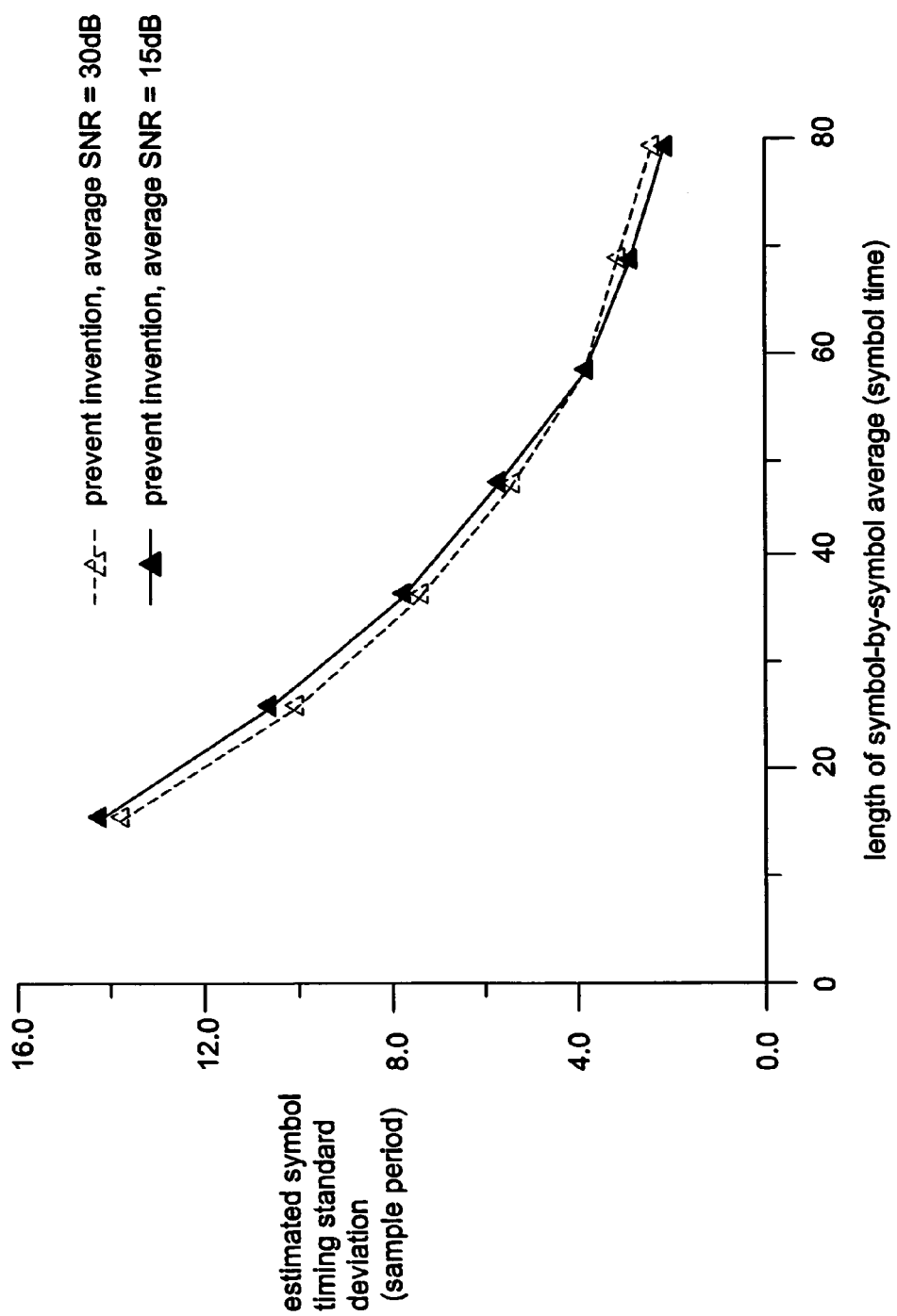
FIG. 11b shows the simulated results for the present invention under different S/N.

Taking the channel parameters used in FIG. 9 as an example, the preferred embodiment of the present invention is compared with the method proposed by Motorola Labs, and the standard deviation of the estimated symbol timing ($\hat{n}_{Sym}$) for both methods are observed. In FIGS. 11a and 11b, the x-axis indicates the window size L1 of the symbol-by-symbol average operation with the symbol time as the unit, and the y-axis is the standard deviation of the estimated symbol timing with the sample period as the unit. The average SNR are 30 dB and 15 dB, respectively. When SNR equals to 15 dB or 30 dB, the optimal threshold for the method proposed by the Motorola Labs will change for different SNR. That is, the optimal threshold found at SNR=15 dB has a larger standard deviation of the estimated symbol timing when the same threshold is used at SNR=30 dB. The optimal threshold of the present invention will not change for different SNR. That is, the standard deviation of the estimated symbol timing will not change much when a fixed optimal threshold is used at SNR=15 dB or 30 dB.

Both the methods of the present invention and the Motorola Labs have the advantages of being applicable when a larger channel delay spread is present. The present invention can also define a fixed optimal threshold to directly separate the ISI region. Even in a severe frequency selective fading channel, the present invention can sample the majority of ISI-free symbol data as long as the ISI-free region exists and the last point of the FFT sampling window is selected at the middle point of the ISI-free region in the receiver.

Furthermore, the number of the symbol-by-symbol average operations used in the present invention is less than that used in the method proposed by Motorola Labs.

In summary, the present invention for the OFDM synchronization method and apparatus is based on the cyclic prefix characteristics of the guard interval. It uses the delay conjugate multiplication module, the phase processor, and the edge detector to detect the location of the ISI-free region. The location of this region, once found, can be used in three advantageous ways.

The first advantage is that the last point of the FFT sampling window in the receiver can be selected at the middle point of the estimated ISI-free region. The selection for the FFT sampling window location indicates the estimation of symbol timing. The ISI is less likely to occur by utilizing the estimated symbol timing. Also, there exists the duration of half the estimated ISI-free region to resist the ISI effects due to sampling clock offset before the next update of the symbol timing. This further reduces the ISI effects.

The second advantage is that more accurate estimation of the FFO can be obtained. Because the detection of FFO is also based on the cyclic prefix characteristics of the guard interval and the delay conjugate multiplication module, the phase signal that includes the information of the FFO can be obtained. If the location of the ISI-free region can be estimated, the phases of all the sample points in the region can be used to detect the FFO. By averaging these phases, the FFO estimation can be more accurate. Once the FFO estimation is more accurate, the FFO estimation can be used to correct and compensate the received signal, the remaining integral carrier frequency offset (IFO) estimation can also be detected more accurately.

The third advantage is to infer the maximum delay spread of the multi-path fading channel from the length of the ISI-free region. When estimating channel impulse response, the maximum delay spread information can be used to filter out some noises. For example, in the terrestrial broadcasting systems of the digital video broadcasting (DVB-T system), the channel frequency response is estimated using the known scattered pilot carriers. The known scattered pilot carriers are placed at the interval of every 12 subcarriers. The sampling signals of the channel frequency response can be obtained using these pilot carriers. The IFFT output of the sampling signals will show the phenomenon of periodic repetition of the channel impulse response in the time domain. Aliasing will not occur in this periodically repeated signal when the spacing of the two successive scattered pilot carriers is small enough. At this point of view, if the channel maximum delay spread is known, this value can be used as a cut-off time of the low-pass filter that is utilized to extract the first group signal of the original periodic signal. Therefore, the noise interference is reduced.

Although the present invention has been described with reference to the preferred embodiment, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for synchronization of orthogonal frequency division multiplexing (OFDM) systems, comprising the steps of:
   (a) taking a normalized phase value to obtain a first output signal by utilizing the cyclic prefix characteristics of a guard interval to perform delay conjugate multiplication on a received signal;
   (b) performing phase processing on said first output signal to obtain a second output signal indicating the location of an inter-symbol interference-free (ISI-free) region; and
   (c) observing variations in said second output signal and using an edge detector to detect the location of said ISI-free region;
   wherein at least one symbol-by-symbol average operation is used after said delay conjugate multiplication or before obtaining said second output signal.

2. The method as claimed in claim 1, wherein said phase processing in said step (b) further comprises a phase differential step, an absolute value calculating step and a symbol-by-symbol average step.

3. The method as claimed in claim 1, wherein said step (c) further comprises the steps of:
   (c1) using a fixed optimal threshold to roughly separate an inter-symbol interference (ISI) region of said second output signal;
   (c2) passing through a filter having a length of M sample periods to clearly separate said ISI region, wherein M is an integer number;
   (c3) using a differential operation to find relative boundaries of said ISI region; and
   (c4) using a mapping relation between said relative boundaries of said ISI region and boundaries of said ISI-free region to find an upper boundary $\tilde{n}_{upper}$ and a lower boundary $\tilde{n}_{lower}$ of said ISI-free region, wherein $\tilde{n}_{upper}$ and $\tilde{n}_{lower}$ are integer numbers.

4. The method as claimed in claim 1, wherein said symbol-by-symbol average operation is to average every L input OFDM symbols to obtain an output OFDM symbol, where said L is an integer number representing the length of said symbol-by-symbol average operation.

5. The method as claimed in claim 3, wherein said fixed optimal threshold is determined before system operation in accordance with the statistic characteristics of said second output signal.

6. The method as claimed in claim 3, wherein in said step (c4), the location of said ISI-free region is transformed into useful information, including the location of middle point and length of said ISI-free region, symbol timing information required for estimating fractional carrier frequency offset, and information for estimating maximum delay spread of a channel.

7. The method as claimed in claim 5, wherein the characteristics of said fixed optimal threshold include the mean and the standard deviation of said second output signal.

8. The method as claimed in claim 6, wherein said middle point of said ISI-free region is determined by using mean value of said upper boundary $\tilde{n}_{upper}$ and said lower boundary $\tilde{n}_{lower}$.

9. The method as claimed in claim 6, wherein said length of said ISI-free region is determined by using the distance between said upper boundary $\tilde{n}_{upper}$ and said lower boundary $\tilde{n}_{lower}$.

10. The method as claimed in claim 6, wherein said maximum delay spread is determined by the difference between the number of sample points in the guard interval of an OFDM symbol and the length of said ISI-free region.

11. A synchronization apparatus for orthogonal frequency division multiplexing (OFDM) systems, comprising:
   a delay conjugate multiplication module to perform the multiplication between a received signal and an N-sample delayed and conjugated version of said received signal, and a phase calculator to obtain a normalized phase value to generate a first output signal;
   a phase processor for processing said first output signal to generate a second output signal indicating the location of an inter-symbol interference-free (ISI-free) region; and
   an edge detector for observing variations in said second output signal and detecting the location of said ISI-free region;
   wherein at least one symbol-by-symbol average operation is used after said delay conjugate multiplication module or before obtaining said second output signal in said phase processor.

12. The apparatus as claimed in claim 11, wherein said phase processor further comprises a differential operation and an absolute value calculator.

13. The apparatus as claimed in claim 11, wherein said edge detector further comprises:
a threshold calculator for determining a fixed optimal threshold to roughly separate an inter-symbol interference (ISI) region of said second output signal;
a filter for clearly separating said roughly separated ISI region;
a differential operation for finding relative boundaries of said ISI region; and
a mapper for building a corresponding relation between said relative boundaries of said ISI region and boundaries of ISI-free region to find an upper boundary and a lower boundary of said ISI-free region.

* * * * *